US012792722B2

(12) United States Patent
Teglia et al.

(10) Patent No.: US 12,792,722 B2
(45) Date of Patent: Nov. 10, 2026

(54) METHOD FOR A SECURE EXECUTION OF A HARDWARE INSTRUCTION

(71) Applicant: THALES DIS FRANCE SAS, Meudon (FR)

(72) Inventors: Yannick Teglia, Belcodene (FR); André Sintzoff, Marseilles (FR); Jean-Roch Coulon, Le Tholonet (FR)

(73) Assignee: THALES DIS FRANCE SAS, Meudon (FR)

( * ) Notice: Subject to any disclaimer, the term of this patent is extended or adjusted under 35 U.S.C. 154(b) by 58 days.

(21) Appl. No.: 18/711,296

(22) PCT Filed: Nov. 17, 2022

(86) PCT No.: PCT/EP2022/082236
§ 371 (c)(1),
(2) Date: May 17, 2024

(87) PCT Pub. No.: WO2023/089011
PCT Pub. Date: May 25, 2023

(65) Prior Publication Data

US 2025/0013735 A1 Jan. 9, 2025

(30) Foreign Application Priority Data

Nov. 18, 2021 (EP) .................................... 21306607

(51) Int. Cl.
*G06F 21/00* (2013.01)
*G06F 21/52* (2013.01)

(52) U.S. Cl.
CPC ........ *G06F 21/52* (2013.01); *G06F 2221/034* (2013.01)

(58) Field of Classification Search
CPC ..... G06F 21/52; G06F 2221/034; G06F 21/75
See application file for complete search history.

(56) References Cited

U.S. PATENT DOCUMENTS 4,465,901 A * 8/1984 Best ........................ G06F 21/72
200/61.08
6,804,782 B1 * 10/2004 Qiu ....................... G06F 9/3001
713/193

(Continued)

OTHER PUBLICATIONS

XP058673073—Nov. 16, 2018—Belleville Nicolas Nicolas Belleville CEA FR et al: Relevant to pp. 1-27, Relevant to claim 1,12,13 Abstract Introduction, Sections 4-5, Listings 1-5; Relevant to claim 2-11 Figures 1, 4.

(Continued)

*Primary Examiner* — Ghazal B Shehni

(57) ABSTRACT

Provided is a secure execution of a first instruction by processing means of an electronic system, comprising fetching (S1) said first instruction in an execution pipeline of the processing means, determining (S2) that said first instruction to be executed is an instruction sensitive to a determined attack, selecting (S3), based on said determined attack, from an internal memory of said processing means, at least one second instruction, which, when executed by the processing means, causes the processing means to perform a combination of said first function and a dedicated security countermeasure against said determined attack, and executing (S4) said selected second instructions instead of said first instruction.

13 Claims, 2 Drawing Sheets

(56) References Cited

U.S. PATENT DOCUMENTS

| | | | | |
|---|---|---|---|---|
| 9,177,122 | B1 * | 11/2015 | Trier | G06F 8/65 |
| 9,804,891 | B1 * | 10/2017 | Adalier | H04L 9/3066 |
| 2010/0011344 | A1 * | 1/2010 | Guterman | G06F 21/755<br>717/124 |
| 2019/0050230 | A1 * | 2/2019 | Branco | G06F 9/3844 |
| 2020/0159888 | A1 * | 5/2020 | Ghose | G06F 12/0842 |

OTHER PUBLICATIONS

XP058433468—Apr. 4, 2019—Mohanmadkazem Taram et al: Relevant to pp. 395-410 Relevant to claim 1,12,13 Introduction, Sections 4-5; Relevant to claim 2-11 figures 4,5.

International Search Report (PCT/ISA/220) and Written Opinion (PCT/ISA/237) mailed on Feb. 27, 2023, by the European Patent Office as the International Searching Authority for current International Application No. PCT/EP2022/082236 [17 pages].

* cited by examiner

METHOD FOR A SECURE EXECUTION OF A HARDWARE INSTRUCTION

FIELD

The present invention relates to the field of securing software execution on an electronic device against attacks, and more particularly to a method for securing the execution of instructions by processing means of the electronic device.

BACKGROUND

Information about modern CPU (central processing unit) architecture and behavior are more easily accessible nowadays than in the past, either by reverse engineering or through open hardware/open source projects openly disclosing information Such information can be used by an attacker to design efficient attacks using fault injection or side-channel analysis, which would enable the attacker to gain knowledge of sensitive information processed by the CPU such as encryption keys. Countermeasures have been designed against such kind of attacks but they usually have a noticeable impact on performance, particularly by inducing a significant increase of memory accesses.

Consequently, there is a need for a method enabling a secure execution of an instruction by a CPU, protected against fault attacks or side-channel analysis, and having a lower impact on performance than existing countermeasures.

SUMMARY OF THE INVENTION

For this purpose and according to a first aspect, this invention therefore relates to a method for a secure execution of a first instruction by processing means of an electronic system, comprising:

- fetching said first instruction in an execution pipeline of the processing means,
- determining that said first instruction to be executed is an instruction sensitive to a determined attack, wherein said first instruction, when executed by the processing means, causes the processing means to perform a first function,
- selecting, based on said determined attack, from an internal memory of said processing means, at least one second instruction, which, when executed by the processing means, causes the processing means to perform a combination of said first function and a dedicated security countermeasure against said determined attack,
- executing said selected second instructions instead of said first instruction.

Such a method enables to add countermeasures to the execution of the instructions performing the first function. Since the replacement of instructions is performed by the processing means themselves directly from an internal memory, it does not require any additional fetching or loading from the main memory of the electronic system, which lowers the impact on performances.

Said dedicated security counter measure may be among variable bounding check, multi memory access, and execution desynchronization.

According to a first embodiment, said dedicated security countermeasure is a variable bounding check to verify that a value to be loaded is between a minimum value and a maximal value and said selected second instructions comprise hardware instructions which, when executed by the processing means, cause the processing means to load said value to be loaded, said minimum value and said maximum value, to compare said value to be loaded to said minimum value, to compare said value to be loaded to said maximum value and, based on said comparison, to trigger an alarm or not.

It enables to prevent fault attacks or malicious software from modifying a value to be loaded out of its allowed range.

According to a second embodiment, said dedicated security countermeasure is a multi memory access to verify a value to be loaded and said selected second instructions comprise hardware instructions which, when executed by the processing means, cause the processing means to load twice said value to be loaded, to compare said loaded values and, based on said comparison, to trigger an alarm or not.

It enables to prevent fault attacks modifying the value to be loaded after the first loading of the value.

Said selected second instructions may address at least one processor register to store temporary values, and said processor register cannot be addressed by any instruction of the Instruction Set Architecture of said processing means.

Selecting at least one second instruction may be based on a predefined policy.

Selecting at least one second instruction may comprise randomly or pseudo randomly selecting at least one instruction from a plurality of hardware instructions which, when executed by the processing means, cause the processing means to perform said combination of said first function and said dedicated security countermeasure.

Performing such a random selection makes unpredictable the execution resulting from a call to the first instruction, in terms of execution time, timings, power consumption etc.. As a result, it becomes a lot more difficult for an attacker to design an efficient attack, particularly statistical attacks such as side channel analysis.

Determining that said first instruction to be executed is an instruction sensitive to a determined attack may comprise detecting in said first instruction a predetermined combination of instruction fields.

Determining that said first instruction to be executed is an instruction sensitive to a determined attack may comprise detecting a predetermined value of a Program Counter of said processing means.

Such determinations are not based on dedicated flags or bits in the software code triggering the call the first instruction. Therefore, no modification of the code is needed to trigger the replacement of the first instruction by the second instructions.

Determining that said first instruction to be executed is an instruction sensitive to a determined attack may comprise determining a predetermined indication in a software code ordering an execution of said first instruction.

Determining that said first instruction to be executed is an instruction sensitive to a determined attack may comprise determining a value of at least one predetermined selection bit of said first instruction.

According to a second aspect, this invention relates to a computer program product directly loadable into the memory of at least one computer, comprising software code instructions for performing the steps of the methods according to the first aspect of the invention when said product is run on the computer.

According to a third aspect, this invention relates to an electronic system comprising processing means configured for performing the steps of the methods according to the first aspect of the invention.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

According to a first aspect, the invention relates to a method for a secure execution of a first instruction by processing means of an electronic system 100.

Figure 1:
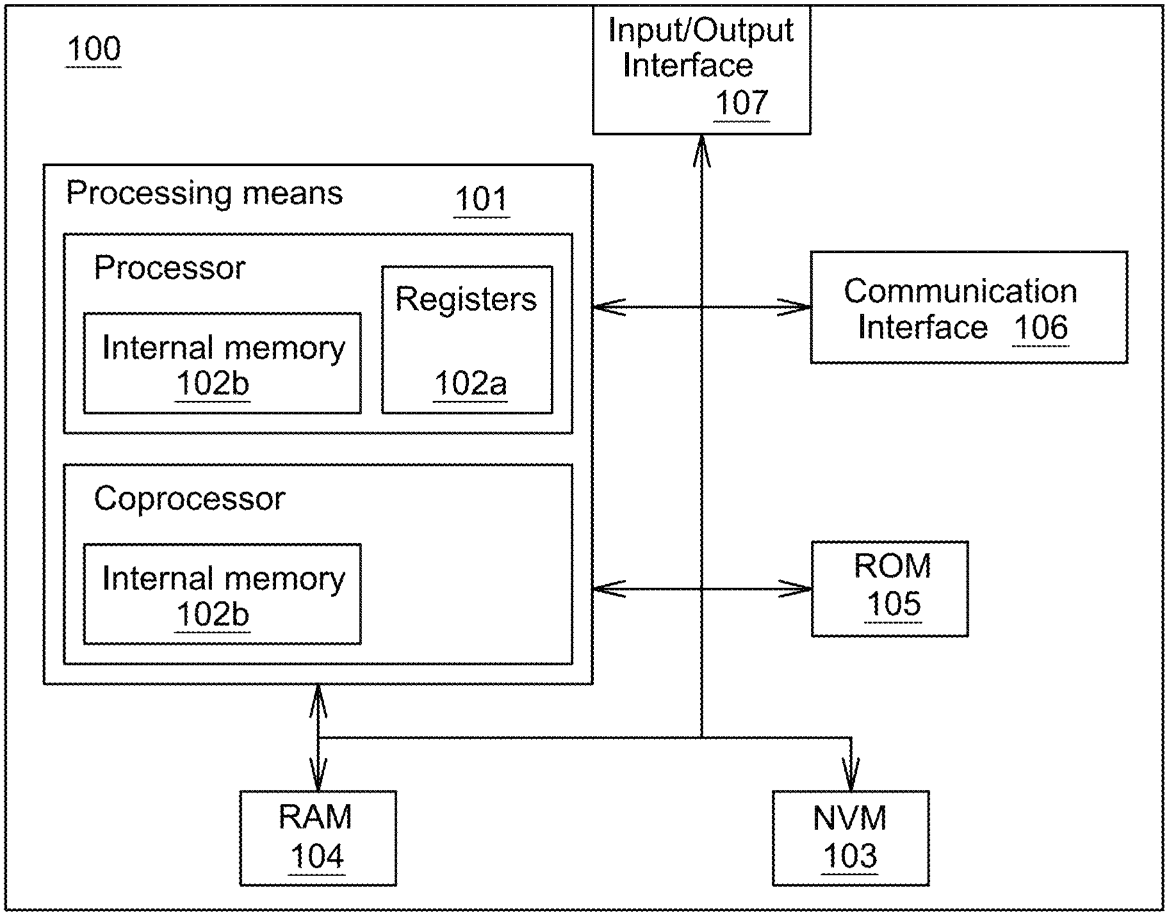
FIG. 1 is a schematic illustration of an electronic system according to the present invention.

Such an electronic system 100 comprises, as depicted on FIG. 1, processing means 101 for the execution of code comprising the first instruction. These processing means may be a hardware processor. Such a processor includes a plurality of registers 102*a*, including a program counter PC. It may also include additional internal memories 102*b* such as cache memories. The processing means may also be a hardware processor and one or more coprocessors, located for example on the same die or the same PCB than the hardware processor. Such coprocessors may also include at least one internal memory 102*b*. The electronic system also comprises at least one memory, such as a Non Volatile memory 103, a RAM memory 104 and/or a ROM memory 105 in which instructions of the code are stored. The electronic system 100 may further include a communication interface 106 by which electronic system 100 may be connected to a network. Such an interface may be a wireless interface connected to an antenna and may be used to connect the electronic system 100 to various forms of wireless networks, e.g., wide-area networks, WiFi networks, or mobile telephony networks. Alternatively, such an interface may be a wired interface such as an Ethernet one. The electronic system 100 may also include input/output means 107 providing interfaces to a user of the first device, such as one or more screens, loudspeakers, a mouse, tactile surfaces, a keyboard etc..

Such an electronic system may for example be a tamper-proof smartcard, a personal computer, a server or a smartphone.

A first main idea of the invention is to replace an instruction to be executed by a series of instructions performing the same function than the original instruction but also at least one countermeasure against a predetermined attack. In order to thwart attacks, the instructions replacing an original instruction should vary from one execution to another of the same original instruction. By doing so, the execution is protected both by the countermeasure executed at the same time and by the fact that the execution length and timings and the signature (in terms of power consumption, electromagnetic emissions) of executing the original instruction will vary from one execution to another.

A second idea of the invention is to make the processing means perform such an instruction replacement internally, from an internal memory of the processor or of a coprocessor, such as registers 102*a*, cache memory or any other internal memory 102*b*, after an analysis by the processing means of the submitted instruction. By doing so, no additional access to a memory located outside the processor or the coprocessors is induced by the method and code impact is minimized.

Figure 2:
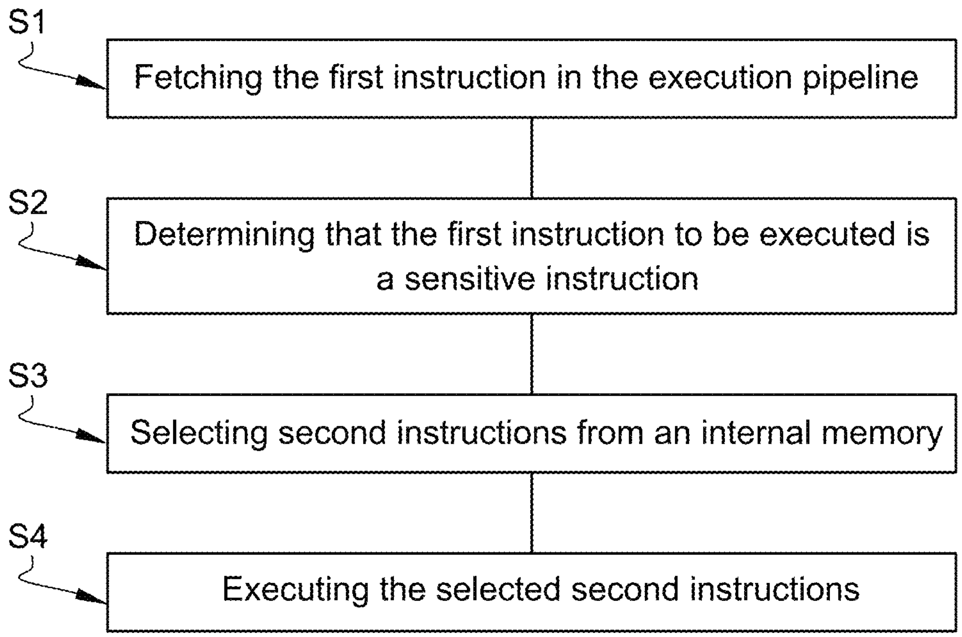
FIG. 2 is a schematic illustration of a method according to an embodiment of the present invention.

The following paragraphs describe in detail the steps, shown on FIG. 2, of the method for secure execution of a first instruction by the electronic system according to the invention.

In a first step S1, the processing means fetch the first instruction from an internal memory in the execution pipeline of the processor of the processing means.

In a second step S2, the processing means determine that the first instruction to be executed is an instruction sensitive to a determined attack, and requires to be protected. This step is performed by the processor of the processing means. Such an attack may for example be a fault attack or any kind of side-channel attack. The first instruction may be considered as sensitive to an attack when the security of the electronic device and of the data manipulated by the first instruction is threatened by such an attack. Such an attack may occur during the execution of the first instruction. Alternatively, the attack may have occurred prior to the execution of the first instruction but the outcome of the first instruction may be altered by the attack, for example when the attack has modified a value used as an argument to the first instruction.

In a first embodiment, the processor determines that the first instruction to be executed is an instruction sensitive to a determined attack by determining a predetermined indication in the software code ordering the execution of the first instruction. The processor may for example recognize a particular value of an argument of the instruction, or a flag located before the instruction in the software code.

In a second embodiment, the processor determines that the first instruction to be executed is an instruction sensitive to a determined attack by determining a value of at least one predetermined selection bit of the first instruction. By doing so, the instruction carries in itself the information that it needs protection.

In a third embodiment, the processor determines that the first instruction to be executed is an instruction sensitive to a determined attack by detecting in the first instruction a predetermined combination of instruction fields. In such a case, the processor, based on the kind of instruction and on arguments of the instruction can determine that the instruction will manipulate sensitive data and therefore that it should be protected. For example, if the instruction is a load instruction from a memory address known to be storing a cryptographic secret key, the processor may identify it as a sensitive instruction to be protected.

In a fourth embodiment, the processor determines that the first instruction to be executed is an instruction sensitive to a determined attack by detecting a predetermined value of a Program Counter of the processor. The processor may store a list of values of the Program Counter corresponding to instructions to be protected.

At the end of the second step S2, when the processing means comprise at least one coprocessor, the processor may delegate the execution of the following steps of the method to a coprocessor when it has determined that the first instruction to be executed is sensitive to a determined attack and requires to be protected.

In the following paragraphs, we will consider that the first instruction, when executed by the processing means, causes the processing means to perform a first function. The first instruction may be any instruction of the instruction set of the processor, such as an addition, a XOR, a load etc. . . . . The first function is defined by its inputs which are the arguments of the first instruction, and its output which is the result of the execution of the first instruction with its arguments. Of course the easiest way to perform the first function is to execute the first instruction but the first function may also be performed by executing various combinations of instructions such that each of these combinations get the output of the first function from its inputs. As an example, when the first instruction is a XOR operation between two registers r1 and r2, the first function is getting XOR(r1,r2) from r1 and r2, and it can be performed by the combination of a first instruction that moves the content of r1 to a third register r3 and a second instruction performing a XOR between r3 and r2.

In a third step S3, the processing means select, based on the determined attack, from an internal memory of the processing means, such as registers 102*a*, cache memory or any other internal memory 102*b*, at least one second instruction which, when executed by the processing means, causes the processing means to perform a combination of said first function and a dedicated security countermeasure against said determined attack. Said differently, the processor, or a coprocessor when the execution of this step has been delegated by the processor at the end of the second step S2, determines a combination of replacement instructions, which from the same inputs than the first instruction obtain the same output but also perform a countermeasure in addition. In order to avoid any access to a memory of the electronic system located outside the processing means, the second instructions are selected from instructions stored in an internal memory of the processor or an internal memory of the coprocessor performing this third step. Instructions may be loaded, prior to the execution of the first step S1, in this internal memory from another memory of the electronic system, or from another device used as repository such as a smartcard, where they are stored encrypted in order to ensure their authenticity and integrity.

In an embodiment, the selected second instructions are all different than the first instruction they replace, such as in the example of the XOR instruction provided above.

As an example, the dedicated security countermeasure may be among the following countermeasures that will be described hereafter: variable bounding check, multi memory access, and execution desynchronization.

In a first embodiment, the dedicated security counter measure is a variable bounding check to verify that a value to be loaded is between a minimum value and a maximal value and said selected second instructions comprise hardware instructions which, when executed by the processing means, cause the processing means to load said value to be loaded, said minimum value and said maximum value, to compare said value to be loaded to said minimum value, to compare said value to be loaded to said maximum value and, based on said comparison, to trigger an alarm or not. By doing so, the value to be loaded is loaded as by the original load instruction but it is also checked versus an authorized range, which enables to detect any surprisingly high or low value.

As an example of such a variable bounding check, a load operation "Id a5,0(a5)" may be replaced by the following operations

```
newId newreg0,4(a5)
newId newreg1,8(a5)
Id a5,0(a5)
newsub newreg0,a5,newreg0
newbltz newreg0, alarmHandler
newsub newreg0, newreg1,a5
newbltz newreg0,alarmHandler
```

where:

newId is a new instruction used to load in new registers newreg0 and newreg1 the min and max values located at a5 +4 and +8 bits to which the loaded value should be compared, newsub is a new subtraction instruction computing and storing in newreg0 the difference first between the value to be loaded and the min value, and then between the max value and the value to be loaded, newbltz is a new instruction raising an alarm when the content of newreg0 is negative, which indicates that the value to be loaded is out of the bounds defined by the min and max values.

In a second embodiment, the dedicated security counter measure is a multi memory access to verify a value to be loaded and the selected second instructions comprise hardware instructions which, when executed by the processing means, cause the processing means to load twice the value to be loaded, to compare the loaded values and, based on the comparison, to trigger an alarm or not. By doing so the processor or a coprocessor can determine if an attack has modified the loaded value during or just after one of the two loads.

As an example of such a multi memory access, a load operation "Id a5,0(a5)" may be replaced by the following operations

```
newId newreg0, 0(a5)
Id a5,0(a5)
newand newreg0, a5,newreg0
newbltz newreg0,alarmHandler
```

where newId is a new operation loading the value from address a5 in another register newreg0, newand is a new operation comparing the content of newreg0 and the value to be loaded and outputting a value to newreg0 depending on the result, and newbltz is a new instruction raising an alarm when the content of newreg0 is negative, which indicates that the two loads resulted in loading different values.

In a third embodiment, the dedicated security counter measure is an execution desynchronization of the first instruction. In such a case the selected second instructions comprise any hardware instructions which, when executed by the processor or a coprocessor, modify the time required to perform the first function without modifying its result. This countermeasure is such that the duration of performing the first function varies from one call to the first instruction to another one.

The selection of the second instructions replacing the first instruction may be based on a predefined policy, for example depending on the sensitivity of the data manipulated by the first instruction or on flags activated or not in registers or a memory of the electronic system.

Alternatively, the selection of the second instructions may comprise randomly or pseudo randomly selecting at least one instruction from a plurality of hardware instructions which, when executed by the processing means, cause the processing means to perform the combination of the first function and the dedicated security countermeasure. Performing such a random selection makes unpredictable the execution resulting from a call to the first instruction, in terms of execution time, timings, power consumption etc.. As a result, it becomes a lot more difficult for an attacker to design an efficient attack without being able to predict the execution sequence. For example, in order to perform a side channel analysis an attacker will have to either cut part of traces, align them or match inequivalent patterns, making the automation of the process tedious. For performing machine learning based attacks, an attacker will have to increase the size of the learning set, making the database increase proportionally and making attacks more difficult and more costly.

In a fourth step S4, the processing means execute the selected second instructions instead of said first instruction. When the processor has executed itself all the preceding steps, it also executes this step. It replaces the first instruction by the selected second instructions in its own execution pipeline and executes the selected instructions. When the execution of the second and third steps has been performed by a coprocessor, this coprocessor at this fourth step may load in its execution pipeline, when it has one, the second instructions instead of the first instruction and it executes the second instructions. By doing so, no new instruction is fetched from a memory outside the processing means and the first function expected to be performed by calling the first instruction is indeed performed but in a more secure way thanks to the countermeasure also comprised in the second instructions executed by the processor.

As described above, the first instruction may be replaced by a plurality of second instructions. These second instructions may use more registers than the registers used by the first instruction during its execution, for storing intermediate results or additional outputs such as an alarm status for example. Consequently, the selected second instructions may address at least one additional processor register that cannot be addressed by any instruction of the Instruction Set Architecture (ISA) of the processing means, to store temporary values. This is an additional layer of security since these additional registers can only be used directly by the processor at the fourth step and cannot be addressed by any instruction from the RAM memory of the electronic system.

Similarly, new instructions may be defined that cannot be called by an executed software but only by the processing means as part of the second instructions selected as replacement to a first instruction part of the ISA.

According to a second aspect, the invention relates to a computer program product directly loadable into the memory of at least one computer, comprising software code instructions for performing, when said product is run on the computer, the steps of the methods described here before.

In addition to these features, the computer program according to the second aspect of the invention may be configured for performing or may comprise any other features described here before.

The electronic system and method presented here therefore enable to increase the security of the execution of the first instruction by the processing means by combining it with countermeasures. Since the replacement of instructions is performed internally by the processing means themselves directly from their internal memory, it does not require any additional fetching or loading from a memory outside the processing means, which lowers the impact on performances.

The invention claimed is:

1. A method for a secure execution of a first instruction by processing means of an electronic system, comprising:

fetching (S1) said first instruction in an execution pipeline of the processing means, determining (S2) that said first instruction to be executed is an instruction sensitive to a determined attack, wherein said first instruction, when executed by the processing means, causes the processing means to perform a first function, selecting (S3), based on said determined attack, from an internal memory of said processing means, at least one second instruction, which, when executed by the processing means, causes the processing means to perform a combination of said first function and a dedicated security countermeasure against said determined attack, wherein said selecting is performed by the processing means exclusively from said internal memory of said processing means without any access to any memory external to said processing means, and wherein at least one of said at least one second instruction is different from said first instruction, executing (S4) said at least one selected second instruction instead of said first instruction by replacing said first instruction with said at least one second instruction within the execution pipeline of the processing means.

2. The method of claim 1, wherein, said dedicated security counter measure is among variable bounding check, multi memory access and execution desynchronization.

3. The method of claim 2, wherein, said dedicated security countermeasure is a variable bounding check to verify that a value to be loaded is between a minimum value and a maximal value and said at least one selected second instruction comprises hardware instructions which, when executed by the processing means, cause the processing means to load said value to be loaded, said minimum value and said maximum value, to compare said value to be loaded to said minimum value, to compare said value to be loaded to said maximum value and, based on said comparison, to trigger an alarm or not.

4. The method of claim 2, wherein, said dedicated security countermeasure is a multi memory access to verify a value to be loaded and said at least one selected second instruction comprises hardware instructions which, when executed by the processing means, cause the processing means to load twice said value to be loaded, to compare said loaded values and, based on said comparison, to trigger an alarm or not.

5. The method of claim 4, wherein said at least one selected second instruction addresses at least one processor register to store temporary values, wherein said processor register cannot be addressed by any instruction of the Instruction Set Architecture of the processing means.

6. The method of claim 5, wherein selecting (S3) at least one selected second instruction is based on a predefined policy.

7. The method of claim 5, wherein selecting (S3) at least one selected second instruction comprises randomly or pseudo randomly selecting at least one instruction from a plurality of hardware instructions which, when executed by the processing means, cause the processing means to perform said combination of said first function and said dedicated security countermeasure.

8. The method of claim 7, wherein determining (S2) that said first instruction to be executed is sensitive to said determined attack comprises detecting in said first instruction a predetermined combination of instruction fields.

9. The method of claim 8, wherein determining (S2) that said first instruction to be executed is sensitive to said determined attack comprises detecting a predetermined value of a Program Counter of said processing means.

10. The method of claim 9, wherein determining (S2) that said first instruction to be executed is sensitive to said determined attack comprises determining a predetermined indication in a software code ordering an execution of said first instruction.

11. The method of claim 10, wherein determining (S2) that said first instruction to be executed is sensitive to said determined attack comprises determining a value of at least one predetermined selection bit of said first instruction.

12. A non-transitory computer program product directly loadable into a memory of at least one computer, comprising software code instructions for performing a secure execution of a first instruction when said product is run on the computer, by:

fetching (S1) said first instruction in an execution pipeline of the processing means, determining (S2) that said first instruction to be executed is an instruction sensitive to a determined attack, wherein said first instruction, when executed by the processing means, causes the processing means to perform a first function, selecting (S3), based on said determined attack, from an internal memory of said processing means, at least one second instruction, which, when executed by the processing means, causes the processing means to perform a combination of said first function and a dedicated security countermeasure against said determined attack, wherein said selecting (S3) is performed by the processing means exclusively from said internal memory of said processing means without any access to any memory external to said processing means, and wherein at least one of said at least one second instruction is different from said first instruction, executing (S4) said at least one selected second instruction instead of said first instruction by replacing said first instruction with said at least one second instruction within the execution pipeline of the processing means.

13. An electronic system comprising a hardware processor for performing a secure execution of a first instruction by:

fetching (S1) said first instruction in an execution pipeline of the processing means, determining (S2) that said first instruction to be executed is an instruction sensitive to a determined attack, wherein said first instruction, when executed by the processing means, causes the processing means to perform a first function, selecting (S3), based on said determined attack, from an internal memory of said processing means, at least one second instruction, which, when executed by the processing means, causes the processing means to perform a combination of said first function and a dedicated security countermeasure against said determined attack, wherein said selecting (S3) is performed by the processing means exclusively from said internal memory of said processing means without any access to any memory external to said processing means, and wherein at least one of said at least one second instruction is different from said first instruction, executing (S4) said at least one selected second instruction instead of said first instruction by replacing said first instruction with said at least one second instruction within the execution pipeline of the processing means.

* * * * *